United States Patent [19]
Chavannes

[11] 4,311,746
[45] Jan. 19, 1982

[54] CORRUGATED PAPER BOARD

[76] Inventor: Marc A. Chavannes, 7356 Point of Rocks Rd., Sarasota, Fla. 33581

[21] Appl. No.: 94,833

[22] Filed: Nov. 16, 1979

Related U.S. Application Data

[63] Continuation-in-part of Ser. No. 878,158, Feb. 15, 1978, Pat. No. 4,232,074, which is a continuation-in-part of Ser. No. 599,142, Jul. 25, 1975, Pat. No. 4,203,790.

[51] Int. Cl.³ .......................... B32B 3/28; B32B 5/10
[52] U.S. Cl. .................................... 428/110; 428/182; 428/186; 428/195
[58] Field of Search ............... 428/198, 107, 195, 110, 428/200, 182, 186, 435; 156/290, 291, 178, 179, 205, 206, 210

[56] References Cited

U.S. PATENT DOCUMENTS

| | | | |
|---|---|---|---|
| 2,739,092 | 3/1956 | Stevenson | 428/535 |
| 2,780,572 | 2/1957 | Carlson | 156/178 |
| 3,597,299 | 8/1971 | Thomas et al. | 428/200 |

*Primary Examiner*—Michael W. Ball
*Attorney, Agent, or Firm*—Lerner, David, Littenberg & Samuel

[57] ABSTRACT

Improved laminated paper products are disclosed in which different paper layers are adhesively secured together with hot melt adhesives. According to one aspect of the invention, the hot melt adhesive is provided on less than the entire surfaces being joined to define an adhesive coated portion which is of an area or size sufficient to adhesively secure the paper layers together and an uncoated section which is of an area or size sufficient to permit evaporation of water across the facing surfaces of the first and second paper layers. Such a laminated paper product is particularly useful in the manufacture of corrugated cardboard products in which a paper liner is adhesively secured to the crests of a corrugated medium with a water-based emulsion adhesive. In such corrugated products in which the disclosed laminated paper product is used as either the liner or the corrugated medium, the water is capable of evaporating through the laminated paper product. The laminated paper products may also comprise wire reinforced paper products in which a plurality of wires are interposed between the paper layers and adhesively bonded to at least one of the paper layers with the hot melt adhesive. Further, particular laminated paper products and methods of manufacturing same are disclosed.

12 Claims, 20 Drawing Figures

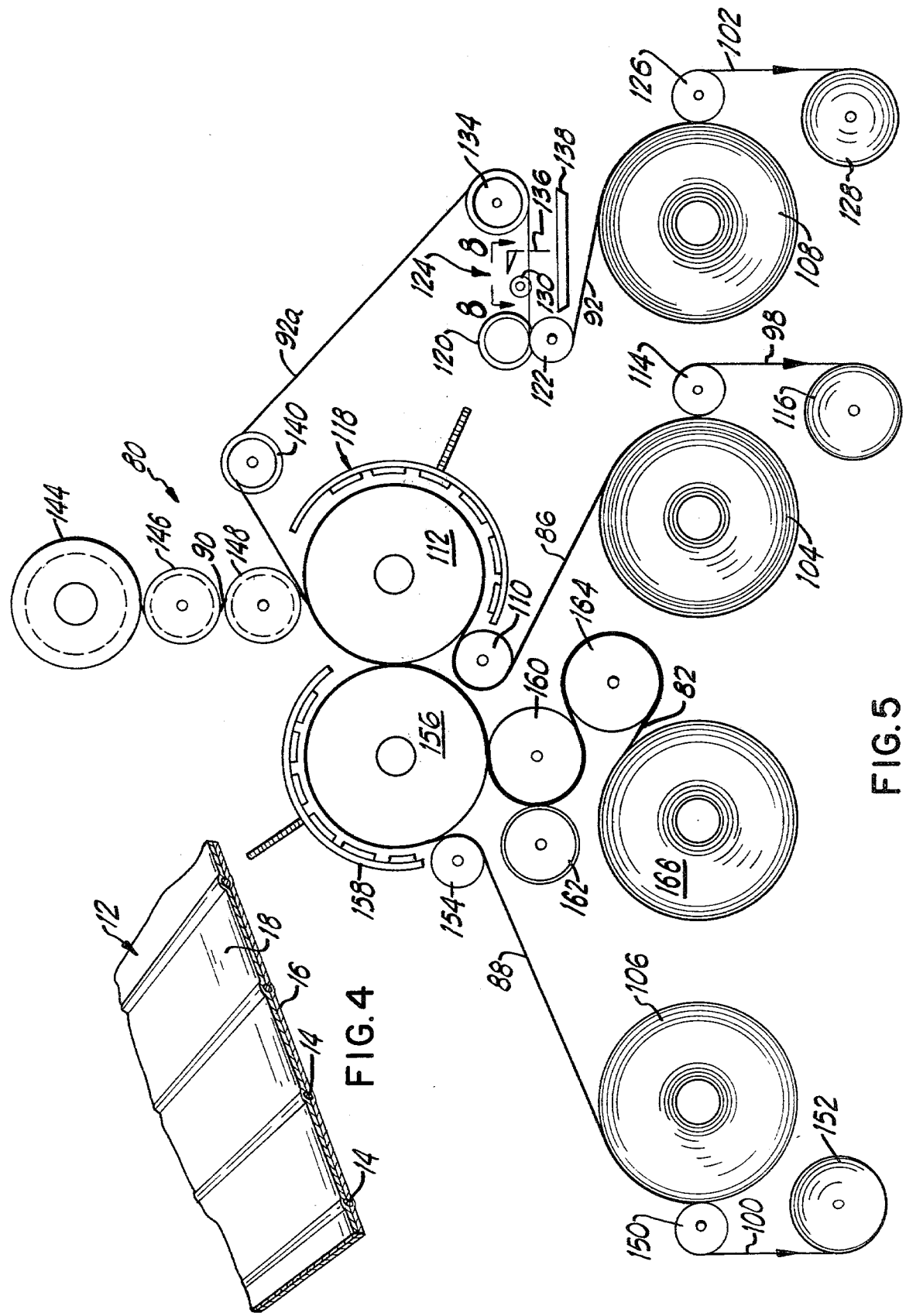

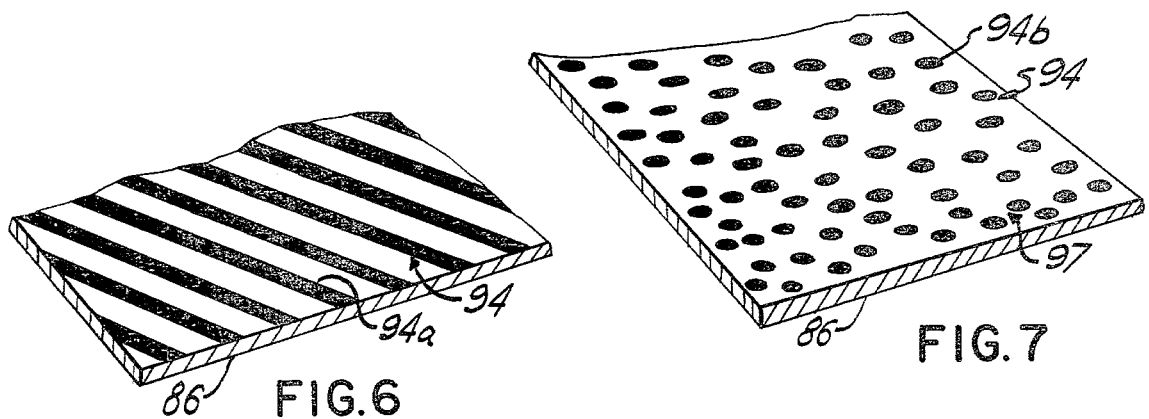
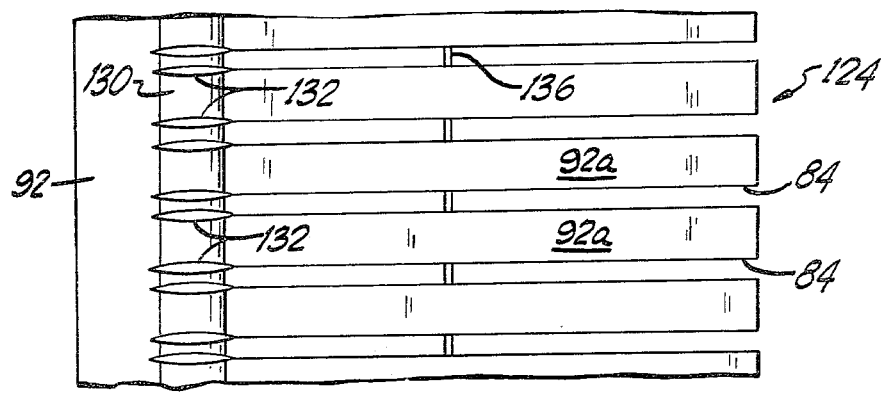
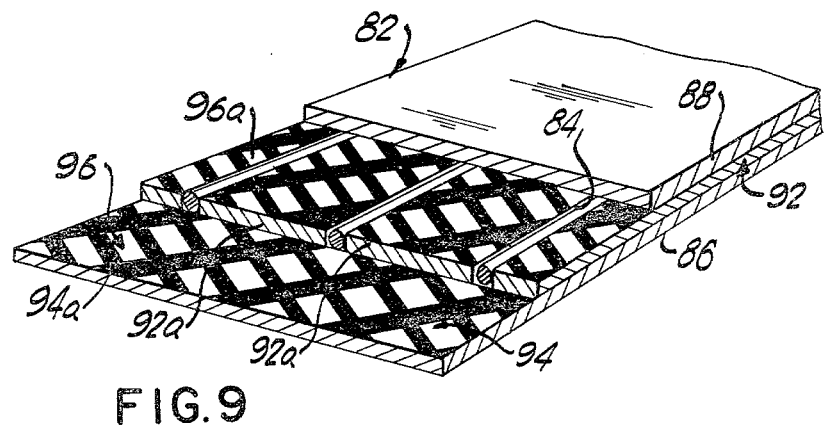

CORRUGATED PAPER BOARD

This is a continuation in part of my copending application Ser. No. 878,158 filed Feb. 15, 1978, which now U.S. Pat. No. 4,232,074 in turn is a continuation in part of my copending application Ser. No. 599,142 filed July 25, 1975, now U.S. Pat. No. 4,203,790.

FIELD OF THE INVENTION

The present invention relates to laminated paper products, and more particularly to laminated paper products for use in making corrugated board.

BACKGROUND OF THE INVENTION

While it is well known to utilize reinforcing elements including various types of fibers to provide increased strength in paper products, the known fibrous materials do not impart much in the way of structural strength, nor do they add much rigidity and stiffness to the finished product. In the case of corrugated board, which is made with various weights of paper, increased stiffness and strength have been obtained by increasing the weight of the paper utilized for both the corrugated central medium as well as the overlying layers or facings. In fact, when heavy packing cases were to be made of corrugated board, several layers of corrugated board had to be laminated in order to obtain the desired stiffness and strength. It is well known that corrugated board has been manufactured for many decades, yet the only procedures that have been considered economical and practical to obtain increased structural strength and stiffness have involved the use of paper of increased weight, and the lamination of layers of corrugated board. It is well recognized however that notwithstanding the utilization of heavier paper, and also the lamination of corrugated board the resulting product is still subject to adverse effects of moisture which results in substantial softening of the board and loss of the protection intended to be afforded by it.

In copending application Ser. No. 599,142, filed July 25, 1975, now U.S. Pat. No. 4,203,790, for "Reinforced Paper Products and Method and Apparatus for the Manufacturing Thereof", there is disclosed an improved wire reinforced corrugated board and other products in which the corrugated medium for corrugated board is comprised of a plurality of wires adhered in contact to a paper web which is then corrugated transversely of the wires so that the wires and the paper conform to one another. This corrugated medium then has outer paper layers or liners adhered to the crest portions of each side of the corrugating medium to form a double faced wire reinforced corrugated board. The plurality of wire elements in the corrugating medium provide improved rigidity and strength for the resulting corrugated board. In particular, the compressive or bending forces applied to the corrugated board may be greatly increased as a result of the triangular truss structure formed by the wire elements in the corrugated medium of a double faced cardboard construction. That is, when compressive or bending forces are applied to the cardboard, the wire legs are placed into compression which is one of the strengths of wire. Thus, the structure will support substantial compressive forces.

Copending application Ser. No. 878,158, filed Feb. 15, 1978, now U.S. Pat. No. 4,232,074 for "Improved Reinforced Paper Products and Method for the Manufacturing Thereof" is directed to a further improvement in such wire reinforced corrugated board in which the plurality of wires are disposed in spaced parallel channels or trenches formed on one surface of a paper layer. The channels are of a depth and thickness substantially corresponding to the thickness of the wires disposed therein, and a second paper layer is adhesively secured over the channels to tightly hold the wires in place between two paper layers. In this manner, a smooth, flat, aesthetically pleasing outer surface for the resulting paper structure is obtained. In addition, the wires are firmly held in place so that they will not move or shift around during subsequent cutting and/or corrugation of the wire reinforced laminate in manufacturing corrugated cardboard. This is most advantageous, particularly when it is realized that the common adhesives used in the corrugated industry have generally comprised water-based emulsion adhesives which have been totally satisfactory in firmly adhering the wires in place between or to the outer paper layers. Thus, the channels serve an important function in preventing the shifting or movement of the wires which is most advantageous in maintaining the integrity of the overall product, as well as maintaining safety in handling and manufacture thereof.

SUMMARY OF THE INVENTION

According to one aspect of the present invention there is provided a laminated paper structure comprising first and second paper layers with a hot melt adhesive interposed therebetween for adhesively securing the first and second paper layers together. The hot melt adhesive is coated on less than the entire mating surfaces of the first and second layers to define an adhesive coated section or portion and an uncoated section or portion. The adhesive coated section is of a size sufficient to adhesively secure the first and second paper layers together whereas the uncoated section is of a size sufficient to permit evaporation of water between the first and second paper layers across the mating surfaces. This is particularly advantageous in providing a paper structure which can be used as either the liner or the corrugated medium of corrugated board in which the liner is adhesively secured to the crests on one side of the corrugated medium with a conventional water-based emulsion adhesive. In such a use of the laminated paper structure of the present invention, the water in the water-based emulsion adhesive can evaporate through the individual paper layers of the laminated paper structure to provide a strong, secure adhesive bond between the liner and the corrugated medium. This would not necessarily be the case if the hot melt adhesive adhesively securing the first and second paper layers of the paper laminate together were coated on the entire mating surfaces.

In the preferred embodiment, the hot melt adhesive between the first and second paper layers is coated on approximately 40-60% of each of the mating surfaces, thereby leaving approximately 60-40% of the surfaces uncoated.

According to another aspect of the present invention, first and second paper layers are arranged in overlying relationship with one another with a plurality of wires and a hot melt adhesive interposed therebetween. The hot melt adhesive serves to adhesively secure the wires to at least one of the mating surfaces of the first and second paper layers, and also serves to adhesively secure the first and second paper layers together. The use of the hot melt adhesive in such a structure is most advantageous since the wires are positively and firmly held or set in place with the hot melt adhesive. In this regard, as the manufacturing process for the wires generally leaves a film of oil on the wires, the use of water-based emulsion adhesives to adhere the wires would not be expected to produce a strong bond between the wires and the paper layer unless the oil is first removed from the wires. On the other hand, with the use of hot melt adhesives a bond is formed between the wires and the paper layers without first removing the oil film since the oil is evaporated or dissolved in the hot melt adhesive.

In the preferred embodiment, the wire reinforced paper product is formed by providing a precoated first paper layer precoated with a hot melt adhesive thereon in which temperature of the hot melt is below its setting temperature, heating the hot melt adhesive to a temperature above its setting temperature just prior to the placement of the wires on the adhesive coated surface of the first paper layer, and then subsequently cooling the hot melt adhesive to below its setting temperature to bond the wires, and the first and second paper layers together.

In accordance with a still further aspect of the present invention, a precoated first paper layer having a hot melt adhesive precoated thereon is provided in which the hot melt adhesive is at a temperature below its setting temperature. A release paper layer covers the adhesively coated surface of the first paper layer which is useful in permitting winding of the precoated paper layer onto supply drums for storage prior to use and/or for transport to a laminating station. As the precoated paper layer with the release paper thereon is unwound from the supply drum in the laminating process, the release paper may be removed, such as by passing it about a second drum and onto a take-up roll for subsequent reuse, to expose the hot melt adhesive coated surface. This precoated paper layer is then fed past a suitable heating means for heating the exposed hot melt adhesive to a temperature above its setting temperature, and then applying a second paper layer onto the heated adhesively coated paper layer. Subsequently, the paper layers are cooled to cool the hot melt adhesive to a temperature below its setting temperature to laminate the two paper layers together. This thus forms a convenient and efficient means for laminating the paper layers together. When wire reinforced paper products are manufactured in accordance with this method, the wires are fed onto the heated adhesively coated surface of the precoated paper layer prior to cooling of the hot melt adhesive.

Also, such a method may be used in connection with forming wire reinforced paper structures such as disclosed in copending application Ser. No. 878,158 now U.S. Pat. No. 4,232,074. In this instance, paper strips are brought into contact with the heated adhesively coated surface of the paper web in spaced parallel fashion to define a plurality of channels extending from the adhesively coated surface of the precoated paper web. Wires may then be set in these channels and subsequently, another adhesively coated paper web, such as for example, coated with a hot melt adhesive and brought up to a temperature above the hot melt adhesive's setting point, is brought into contact with the exposed surfaces of the paper strips to entrap the wires between the pair of outer paper layers. The whole structure may then be cooled to cool the hot melt adhesives below their setting temperature to firmly bond and laminate the paper layers, paper strips and wires together.

It should be noted that in all these latter methods relating to the use of release papers and adhesively securing the wires to paper layers, the hot melt adhesive may be applied to less than the entire surfaces of the mating surfaces being bonded together so as to define adhesively coated portions to secure the layers firmly together and uncoated portions to permit evaporation of water through the paper layers so that the structures may be used in the manufacture of corrugated cardboard in which the corrugated medium and liners are adhesively bonded together with water-based emulsion adhesives which require evaporation of the water to provide a suitable adhesive bond.

According to a still further aspect of the present invention, there is provided a two-way strength wire reinforced paper laminate and method of manufacturing same. The laminate includes a first paper layer having a plurality of spaced parallel channels formed in one surface thereof with the channels being of a depth less than the thickness of the first paper layer, and a plurality of longitudinally extending wires set in the channels. A second paper layer is similarly provided with a plurality of spaced parallel channels formed on one surface thereof, the channels being of a depth less than the thickness of the second paper layer, and a second plurality of longitudinally extending wires set in the channels of the second paper layer. The surface of the second paper layer having the channels therein is adhesively secured to the surface of the first paper layer having the channels therein in a manner such that the channels of the first and second paper layers are transversely oriented relative to one another so that the wires in the respective channels of the first and second paper layers are held in place between the first and second paper layers. Such a structure provides for reinforcement in both of the directions in which the wires extend to thereby provide for double reinforcement. At the same time, a minimum amount of paper is required while still ensuring that each of the layers are firmly held in place. In essence, the surface of the second paper layer having the channels therein serve to trap the wires in the first paper layer by virtue of the fact that the channels of the second paper layer are transversely oriented with respect to those of the first paper layer, and vice versa.

Such a two-way strength wire reinforced paper laminate is particularly useful as the liner of single or double faced corrugated board, i.e., the paper laminate is adhesively secured to the crests of a corrugated medium. Such a structure provides exceptional strength in both of the directions in which the wires are oriented with the minimum amount of paper being required to firmly hold and secure the wires in place. Such firm holding of the wires is particularly important in the corrugated industry in order to ensure the integrity of the product during cutting, as well as to provide a safe manufacturing method and product in which wires are not skewed and do protrude through the paper layers.

These and further features and characteristics of the present invention will be apparent from the following detailed description in which reference is made to the enclosed drawings which illustrate preferred embodiments of the present invention.

BRIEF DESCRIPTION OF THE PREFERRED EMBODIMENT

FIG. 4 is a side perspective view of a wire reinforced paper product produced on the apparatus of FIG. 1.

FIG. 5 is a diagrammatic view of another embodiment of an apparatus for manufacturing a wire reinforced paper structure in accordance with the present invention in which the wires are set and held in place in channels between a pair of outer paper layers.

FIG. 6 is a side perspective view of one form of a precoated paper layer having a hot melt adhesive precoated thereon in a pattern to provide an adhesive coated portion and an uncoated portion for the finished laminate when the paper layer illustrated is laminated to another similar precoated paper layer.

FIG. 7 is a perspective view of another form of a precoated paper layer showing a different or alternative pattern on which the hot melt adhesive is coated to provide a finished laminate having an adhesive coated portion and an uncoated portion.

FIG. 8 is a plan view taken along lines 8—8 of FIG. 5 illustrating the cutting of a paper web to form a series of paper strips to be adhesively secured between a pair of outer paper layers, the spacing of the strips defining channels for receiving wires.

FIG. 9 is a side perspective view, partly in section and partly broken away, of the wire reinforced paper product produced in accordance with the apparatus shown in FIG. 5.

DETAILED DESCRIPTION OF THE PRESENT INVENTION

Figure 1:
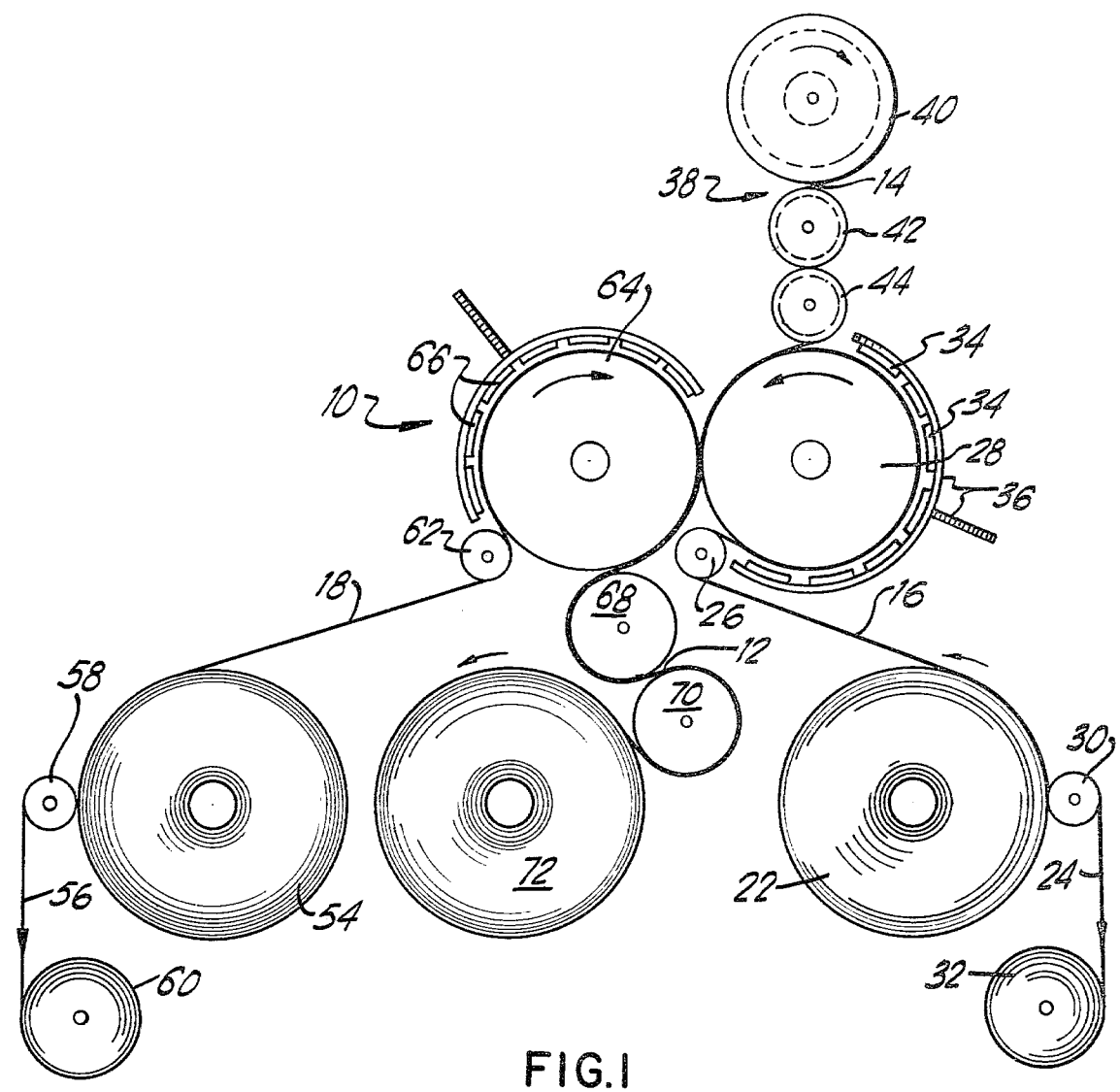
FIG. 1 is a diagrammatic view of one form of apparatus for manufacturing a wire reinforced paper structure in accordance with the present invention in which the wires are adhesively secured between a pair of paper layers.

In the aforementioned copending application Ser. No. 599,142, filed July 25, 1975, now U.S. Pat. No. 4,203,790, there is disclosed an improved reinforced paper product in which the corrugating medium of a corrugated cardboard is formed from a paper structure having a plurality of parallel spaced wires adhesively secured thereto and corrugated transversely of the wires. As set forth in that copending application, the wire reinforcing elements serve to materially increase the strength of the paper and corrugated board, not only by reason of the wire itself, but because of the configuration of the resultant laminate embodying the wire elements, i.e., a triangular truss structure formed by the wire elements. Further, it was stated that the utilization of the wire reinforcing elements in corrugated board in the manner disclosed in that application made it possible to obtain as much as three times the structural strength utilizing only a moderate weight paper with a 10 mil wire at ¼" wire spacing than was otherwise obtainable by the strongest corrugated board available at that time. It is to be noted that this increased structural strength was with respect to compression and/or bending of corrugated board.

Application Ser. No. 878,158, filed Feb. 15, 1978, now U.S. Pat. No. 4,232,074 discloses an improved wire reinforced paper structure which was in furtherance of and in addition to the teachings of application Ser. No. 599,142. According to application Ser. No. 878,158 there is provided an improved paper structure in which the wire reinforcing elements are more firmly and rigidly held in place by placement of the wires in channels formed between overlying paper webs. Thus, the improved wire reinforced paper structure may be used as the corrugated medium and/or as the liner of corrugated board to provide improved wire reinforced corrugated board. In part, the improvements in these structures are the result of the wires being rigidly and firmly held in place so that during cutting operations as well as corrugating operations the wire reinforcing elements do not shift or move, or break through the paper layers to become exposed.

The present invention is directed to a still further improvement with respect to such paper structures and method of manufacturing of same which are particularly useful in producing corrugated paper products, such as for example, a corrugated medium, single faced corrugated board and double faced corrugated board. In particular, in accordance with the present invention, improved paper structures are produced by utilizing a hot melt adhesive to adhesively secure the individual paper layers together.

In this regard, a hot melt adhesive, as the term is used in the present invention, is a thermoplastic material that is a solid at ambient temperature, and which, upon heating melts and may be applied to a substrate which in turn is applied to another substrate so that one substrate is bonded to the other for the cooling and setting of the thermoplastic material. One way to bond the substrates together is to apply the second substrate to the substrate containing the hot melt adhesive immediately after the hot melt is applied. Another way is to apply the hot melt to one substrate and allow it to cool until it is harden. Since the hot melt adhesives are thermoplastics, the substrates containing the solidified hot melt adhesive material may be heated until the material melts and a second substrate applied. The essential feature of any hot melt adhesive is that upon cooling the hot melt, after it is applied to the desired substrate, it forms a bond by simple cooling to a temperature below its setting temperature. This is to be distinguished from other types of adhesives in which bonds are formed by cross linking or chemical reactions, such as water-based emulsion adhesives which require evaporation of the water to produce a bond.

Preferably, the hot melt adhesives which may be used in accordance with the present invention comprise amourphous polypropylene hot melt adhesives. Examples of such hot melt adhesives include Gulf NUMEL 400 hot melt adhesives, and EASTOBOND adhesives A-8 and M-5W, manufactured by Eastman Chemical Products, Inc. (EASTOBOND is a registered trademark). The properties and application characteristics of these adhesives are as follows:

|  | Gulf NUMEL 400 | EASTO-BOND A-8 | EASTOBOND A-5W |
| --- | --- | --- | --- |
| Ring and Ball Softening Point | 250° F. | 270° F. | 223° F. |
| Typical Application Temperature | 350° F. | 350° F. | 325° F. |
| Viscosity at Application Temperature | 75000 cP | 19000 cP | 55000 cP |

The ring and ball softening point, the application temperature and the viscosity are standard parameters for describing hot melt adhesives. The ring and ball softening point represents the temperature of the hot melt adhesive at which the hot melt begins to soften and be workable. The application temperature represents the temperature of the hot melt adhesive at which the substrates and materials to be bonded should be brought into contact with the hot melt in order to produce a good bond upon cooling. The viscosity represents the Brookfield Thermosel viscosity of the melted or fluid hot melt at the application temperature. In terms of the setting temperatures for hot melt adhesives, such temperatures are not generally included as a parameter of hot melt adhesives. However, it is to be noted that the setting temperature for a hot melt adhesive would be below its application temperature, and above its ring and ball softening point.

Various procedures may be utilized in the formation of the various improved paper products of the present invention, as more fully described hereinbelow. In the preferred embodiments, each of the paper layers or paper webs used in forming the laminated paper products of the present invention is precoated in any conventional and suitable manner with a hot melt adhesive which is then allowed to cool to a temperature below its setting (or initial bond forming) temperature, and preferably, below the ring and ball softening point. Thereafter, the precoated hot melt adhesive on the paper web is heated to or above its application temperature and the material to be bonded thereto applied to the adhesively coated surface. The laminate is then cooled to below its setting temperature to produce the desired bond, and eventually, cooled to ambient temperature. It will be appreciated however that bonding of the materials could be accomplished without such precoating by applying the heated or melted adhesive to one of the materials (such as one of the paper webs) and then immediately applying the other material to the first material and then cooling the joined materials.

Furthermore, in accordance with the preferred embodiment, the paper layers or webs after being coated with the hot melt adhesive are wound onto suitable supply rolls for storage and/or subsequent transport to the laminating apparatus. In this regard, it has been found to be generally preferable for paper webs precoated with an amorphous polypropylene hot melt, such as for example the hot melts listed above, to apply a release paper liner or web to the coated surface before winding onto the supply roll to prevent any possible sticking of the adhesively coated surface to the back of the paper web. Subsequently, the precoated paper webs are unwound from the supply rolls and fed to the laminating apparatus, with the release paper liners being removed during the unwinding from the supply roll to expose the adhesive coated surface of the paper webs. The release paper liner is preferably silicone coated so that it may be easily removed during unwinding of the paper web. The removed release paper liners may be wound onto suitable take-up reels and reused many times. Similarly, the surfaces of any roll, drum or idler with which the coated side of the paper web may come into contact are coated with silicone or teflon, or other non-suitable material, to prevent sticking of the hot melt coating thereto as the paper web is fed thereabout.

With the above consideration in mind, the various apparatus, methods and products in accordance with the present invention will now be described.

Figure 2:
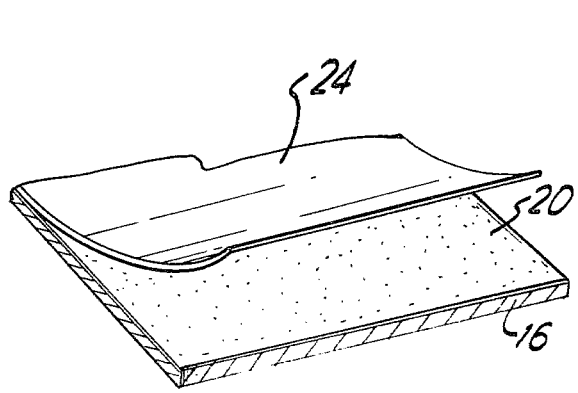
FIG. 2 is a perspective view of one of the paper layers used in the apparatus of FIG. 1 illustrating a hot melt adhesive precoated thereon and having a release paper being removed from the adhesive coated surface of the paper.

Referring first to FIG. 1, there is shown therein a diagrammatic view of a laminating apparatus 10 for producing a wire reinforced paper laminate 12 having a plurality of parallel, spaced wires 14 interposed between a pair of outer paper layers 16, 18 and bonded to the paper layers 16, 18, and the paper layers 16, 18 in turn bonded to one another, to tightly and firmly hold the wires 14 in position after the hot melt adhesive is cooled to below its setting temperature. In this apparatus and process, a first outer paper web 16, precoated with a suitable hot melt adhesive 20 is provided wound on a supply roll 22 with a release liner 24 overlying the adhesive coated surface. The first paper web 16 is unwound from the supply roll 22 and fed about a suitable idler roller 26 onto the surface of a cylindrical laminating drum or roll 28. The release paper liner 24 is removed from the surface of the precoated paper web 16 to expose the hot melt adhesive 20 by passing the liner 24 about an idler roller 30 and directing it to a release paper take-up roll 32 for subsequent reuse. A side perspective view of a portion of the paper web 16 having the adhesively coated layer of hot melt adhesive 20 thereon and with the release paper 24 being lifted away therefrom is shown in FIG. 2.

As the paper web 16 is fed about the laminating drum 28, the adhesively coated surface, which is facing away from the cylindrical surface of the drum 28, is heated with the use of suitable heating devices 34 to raise the temperature of the hot melt adhesive to an appropriate application temperature or slightly thereabove so that a suitable bond will be obtained when the wires and/or other paper layers are applied thereto and the resulting laminate cooled. Typically, for paper webs coated with amorphous polypropylene hot melts, such as those noted above, the application temperature may be in the range of from 325° F. to 360° F. The heating devices 34, for example, may comprise electric resistance heating units which are arranged in close proximity about a portion of the cylindrical surface of the drum 28. The distance of the heaters 34 from the coated surface of the paper layer 16 as it moves about the drum 28 can be varied by suitable adjustment of the supports 36 thereof, depending on the speed of the lamination operation, i.e., the speed at which the paper web 16 is fed from the supply roll 22 and moves about the drum 28 and also the speed at which the wires and other paper layers are fed thereonto. For example, with the present invention, this speed may be on the order of 1000 ft./min. or greater.

Next, the first paper web 16 is fed past a wire delivery station 38 at which a plurality of longitudinally extending wires 14 which are parallel to one another and laterally spaced are set into the softened hot melt adhesive 20 on the surface to the first paper layer 16. The wires 14 are supplied from a spool arrangement 40 and guided through a guide idler 42 which sets the wires 14 at the proper spacings, for example on ¼" centers. From the guide idlers 42, the wires 14 pass about a heating drum 44 which similarly includes appropriate guide channels for guiding of the webs 14 and which also serves to appropriately heat the wires 14 to an elevated temperature. This heating of the wires 14 ensures that a good bond will be provided between the first paper layer 16 and the wires 14, and further ensures that there will not be any lowering of the temperature of the hot melt adhesive below its suitable application temperature, which might otherwise adversely affect bonding of a second paper layer thereto.

Figure 3:
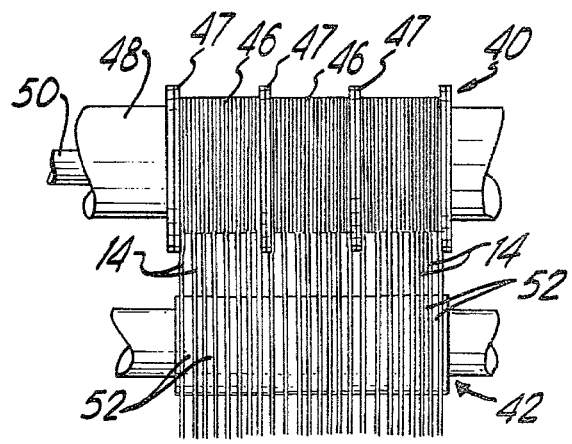
FIG. 3 is a plan view of the spool and guide arrangement utilized in the apparatus of FIG. 1 for guiding of a plurality of wires in parallel relationship onto the adhesively coated surface of one of the paper webs.

FIG. 3 shows a plan view of the wire spool arrangement 40 and guide idler 42 for delivering and properly spacing the wires 14 onto the surface of the first paper web 16. The spool arrangement 40 comprises a plurality or battery of individual spools 46 of wire mounted on a common cylinder 48, the common cylinder 48 in turn being mounted on an axle 50 for rotation. Each of the individual spools 46 holds a plurality of wires 14 which have been wound thereon in compact relationship in order to provide the desired spacing for the wires 14 so they can be guided through the guide idler 42 and heating drum 44 onto the adhesively coated surface of the first paper layer 16. For instance, if a ¼" spacing between the wires 14 is desired in the finished product, each of the individual spools 46 could be loaded or charged with, for example, eight wires wound between the flanges 47 on the spools 46. For this ¼" spacing, the flanges 47 would thus be on the order of 2" apart. By using this arrangement, it is possible to use a battery of wire extruding machines which run at a very high speed, for example on the order of 2,000 feet per minute, to charge each of the individual spools 46. That is, a battery of eight extruders running side by side could deliver eight wires at one time to charge a single spool 46. The charged spools 46 would then be mounted and keyed on the common cylinder 48. Further in this regard, it is to be noted that use of individual spools 46 which each hold a plurality of wires minimizes the number of flanges 47 for the spooling arrangement 40. This is most desirable since, as can be appreciated, each flange 47 takes up a relatively large space when compared to the wires 14.

At the guide idler 42, the wires 14 from the individual spools 46 are guided between appropriately spaced peripheral flanges 52 to guide the wires 14 precisely thereabout and into similar guide channels on the wire heating drum 44, and from there, onto the softened heated hot melt coated surface of the first paper web 16 moving about the laminating drum 28. The wire heating drum 44 is essentially the same as the guide idler 42 with the exception that it is appropriately heated, such as by passing of heated water therethrough to raise the temperature of the wires 14.

After the wires 14 have been fed onto the softened heated adhesively coated surface of the first paper web 16, a second paper web 18 is adhesively secured thereto in overlying relationship with respect to the adhesively coated surface of the first web 16 and the wires 14 embedded therein. Preferably, the second paper web 18 is also precoated with a hot melt adhesive which has been heated to or above its application temperature before being brought into contact with the adhesively coated surface of the first paper web 16.

For this purpose, a second supply drum 54 is provided having a second paper web 18, precoated with a hot melt adhesive at a temperature below its setting temperature, wound thereon with a second release paper web or liner 56 overlying the adhesively coated surface. As the second paper web 18 is fed from the supply drum 54, the release paper liner 56 is removed by passing about idler roller 58 to thereby expose the adhesively coated surface of the second paper layer 18, the liner 56 being fed onto an appropriate release paper take-up reel 60 for subsequent reuse.

The second precoated paper web 18 is fed about a second idler roll 62 onto a second laminating drum 64 which has suitable heating means 66 arranged in close proximity to its outer cylindrical surface, similar to the first heating units 34 to heat the hot melt adhesive coated on the second paper web 18 to a temperature above its setting temperature so as to be at an appropriate application temperature. Again, the second heating units 66 are adjustable to vary the distance between the heating units 66 and the hot melt adhesive layer on the second paper web 18, depending on the speed of lamination.

The second laminating drum 64 is positioned adjacent the first laminating drum 28 to define a nip therebetween through which the first paper web 16, with the wires 14 disposed in the hot melt adhesive on the surface thereof, and the second paper web 18 are both passed to be moved into overlying, contacting relationship and pressed together. The spacing between the two laminating drums 28, 64 is controlled so that a light pressure is applied to the overlying webs 16, 18 to ensure that the webs 16, 18 and adhesive coatings (as well as the wires 14) are in firm contact with one another but not so small as to cause the melted adhesive to flow from between the webs 16, 18. The overlying first and second paper webs 16, 18 with the wires 14 therebetween are then directed about the second laminating drum 64 to a pair of cooling drums 68, 70 which are suitably cooled, such as with water preferably at a temperature under 40° F., to thereby cool the hot melt adhesive to a temperature below its setting temperature. In this way, a firm secure bond is produced between the first and second paper webs 16, 18, as well as between the wires 14 and each of the first and second webs 16, 18. After cooling, the finished laminate 12 (as best seen in FIG. 4) is wound onto a suitable take-up reel 72.

Subsequently, the finished laminate 12 may be used for example in connection with the manufacture of corrugated board which is more fully described for example hereinbelow, or in connection with the methods, products and apparatus which are the subject of copending application Ser. No. 599,142. In this regard, it is to be noted that the wires 14 do produce ridges or slight bulges in the surfaces of the paper laminate 12. However, this is not objectionable, in particular when the ridged paper laminate 12 is subsequently corrugated and used as the corrugated medium of double faced or single faced corrugated board. This will be more fully described hereinbelow with reference to FIGS. 18 and 19.

It is to be noted that in contrast to the arrangement for producing wire reinforced paper products as shown in copending application Ser. Nos. 599,142 and 878,158 in which primarily water-based emulsion adhesives were used for adhering the paper layers together, the use of hot melt adhesive in the present invention results in the wires 14 themselves being firmly adhesively bonded to the paper layers 16, 18, or at least one of the paper layers 16, 18 without having to first clean the wires 14. In this regard, it is to be understood that in the manufacture of the wire elements of a very small diameter as used in the present invention, generally a thin film of oil exists on the wires which prevents the water-based emulsion adhesives from bonding to the wires unless the oil is first removed. Otherwise, the adhesive only secures the paper layers together with the wires being entrapped therebetween. Thus, if the adhesive bond produced with the water-based emulsion adhesive is not properly evaporated, or a proper mix is not used, although the two paper liners would generally remain together, there was the possibility that the wires could move or shift between the two outer layers of paper, especially during a subsequent corrugating operation or cutting operation as is conventional in the corrugated paper board making industry.

On the other hand, with the use of hot melt adhesives according to the present invention, the oil is dissolved or dissipated in the hot melt adhesive such that a strong adhesive bond can be formed between the wires 14 and another substrate, namely the paper web 16 or 18, without first having to clean the wires 14. This is especially advantageous in the corrugated paper board main industry since during corrugating and/or cutting operations, the wires 14 will remain firmly and securely held in place and not move about. Thus, the wires 14 will be corrugated and/or cut with the paper. This in turn results in a safe product being produced in that the tendency or possibility of wires 14 breaking through or cutting the outer paper layers 16, 18, thus exposing the wires 14, is minimized. At the same time, the strengthening characteristics resulting from the use of such wires will be fully appreciated.

In this regard, it is to be noted that preformed channels for holding the wires in place, such as for example disclosed in application Ser. No. 599,142, are not required for holding the wires 14 in place with the use of hot melt adhesives in accordance with the present invention. On the other hand, the use of such preformed channels may be desired for other purposes, such as for producing wire reinforced laminate having smooth outer surfaces, and of course would be utilized (see for example, the laminate product 82 produced with the apparatus 80 of FIG. 5, described hereinbelow).

FIG. 5 illustrates diagrammatically an alternative apparatus 80 for the manufacture of an alternative wire reinforced paper laminate 82 in accordance with the present invention, and in particular, for the manufacture of a wire reinforced laminate 82 in which wires 90 are provided in channels or notches 84 between a pair of outer paper layers 86, 88 which serve to firmly and securely hold the wires 90 in place, as well as to provide a relatively smooth, unridged exterior surface of the finished laminate 82. Such a laminate 92 as produced with this apparatus 80 is shown in perspective, partially broken away, in FIG. 9.

The apparatus 80 is similar to that shown in FIG. 1 with two important exceptions. First, an additional paper layer 92, which has been cut or notched to define a series of channels 84, is interposed and adhesively secured between a pair of outer paper layers 86, 88. Thus, a structure 82 similar to that disclosed in the aforementioned U.S. patent application Ser. No. 878,158 is provided. Secondly, each of the paper layers 86, 88, 92 is precoated with a hot melted adhesive in a pattern so that after lamination, the hot melted adhesive is on less than the entire surface areas of the laminated paper webs 86, 88, 92 to provide both an adhesively coated section or portion 94 and an uncoated section or portion 96 between the joined paper web 86, 92 and 92, 88.

This latter difference is particularly advantageous in the context of the use of the wire reinforced paper laminate 82 in a conventional corrugating operation in which liners or outer facings are adhesively bonded to the crests of a corrugated medium, as described more fully hereinbelow, with water-based emulsion adhesives such as for example, aqueous solutions of vinyl starch. One example of such a conventional water-based emulsion adhesive is manufactured by National Starch & Chemical Corp. and comprises an aqueous solution containing VINAMYL, a chemical modification of starch, CROSREZ, a catalyst, and DURABOND, a chemically modified starch. VINAMYL, CROSREZ and DURABOND are trademarks of the National Starch & Chemical Corporation. The proper proportions and procedures for mixing of same are disclosed in both copending application Ser. Nos. 878,158 and 599,142. Of course, other water-based emulsion adhesives may also be used, as is well known in the art.

Generally, such water-based emulsion adhesives, for proper setting and curing, require evaporation of the water, normally through the paper liners. Thus, as can be appreciated, if a paper laminate liner were formed from two or more paper layers laminated with a hot melt or other water-resistant adhesive along their entire adjoining surfaces, evaporation of the water in the adhesive adhering the liner to the corrugated medium would take considerably longer, or might even be prevented entirely. This would deleteriously affect the adhesive bonding qualities of the water-emulsion adhesive.

Therefore, in accordance with the present invention, the hot melt adhesive adhesively bonding the paper layers 86, 92 and 92, 88 together is only applied to a portion of the surfaces being joined so that there will be adhesive coated sections 94 and uncoated sections 96. The adhesive coated section 94 must be sufficient to adhesively secure the two paper layers 86, 92 and 92, 88 together, whereas the uncoated section 96 must be sufficient to permit the evaporation of water between the layers 86, 92 and 92, 88 across the mating surfaces. It is contemplated, in accordance with the present invention, that the adhesively coated section 94 comprises approximately 40–60% of the area between the two bonded surfaces, and that the uncoated section 96 thus comprises 60–40% of the area (i.e., the layer of hot melt adhesive contacts 40–60% of each of the mating surfaces of the paper layers 86, 92 and 92, 88 to be laminated, thereby leaving 60–40% uncoated).

Several examples of hot melt adhesive-coated patterns on the individual layers can be seen in FIGS. 6 and 7. In FIG. 6, one layer 86, to be joined to another layer 92 is provided with strips or lines 94a of hot melt adhesive on the surface thereof running in a first direction. The other paper web (not shown) to be joined thereto is provided with similar strips or lines of adhesive, but applied in a transverse direction so that when the two adhesively coated surfaces are mated one with the other, the respective strips crisscross one another (see the broken away portion of the finished laminate 82 in FIG. 9). The spacing between the respective lines of adhesive is such that after lamination, the layer of hot melt adhesive numerous uncoated portions 96a between the crossing strips 94 of adhesive. The area of uncoated spaces 96a is approximately from 60–40% of the area between the laminated paper layers 86, 92. A second alternative pattern for the coating of the hot melt adhesive is shown in FIG. 7 in which randomly arranged spots or dots 94b of hot melt adhesive are applied to each of the paper layers (only one 86 of which is shown) to be joined. Thus, when heated and pressed into contact with another web (which may or may not be similarly coated), the hot melt will occupy an area lying in the range from 40% to 60% of the total area between the two joined webs. Of course, other patterns of precoating of hot melt adhesives on to the various paper layers can be utilized. With either of these alternative forms of coating, the adhesive coated portion 94 will be of a sufficient size to adhesively secure the webs 86, 92 together while the uncoated sections 96 will be of a size sufficient to permit of evaporation of water thereacross to allow for proper drying and curing of water-based emulsion adhesives when the paper laminate 82 is joined to, for example, a corrugated medium, as will be discussed more fully hereinbelow.

The precoating of the hot melt adhesive onto the different paper layers 86, 88, 92 can be accomplished by any conventional means, such as for example, with a conventional cylinder coating machine in which the cylinders are engraved with lines and/or dots for application of heated, viscous hot melt onto the paper layers 86, 88, 92, so that upon subsequent cooling, suitably precoated paper layers 86, 88, 92 are produced which may then have a release paper liners 98, 100, 102 applied to the coated surfaces, and both the coated paper layers 86, 88, 92 and release liners 98, 100, 102 rolled onto suitable supply rollers or drums 104, 106, 108 for subsequent use in a laminating application 80 such as that shown in FIG. 5. Such coating machines for precoating of hot melt adhesives are well known in the art and therefore need not be described herein.

Referring now to the apparatus 80 as shown in FIG. 5, a first adhesively coated paper layer 86 is fed from a supply drum 104 about an idler roller 110 to a first laminating drum 112. The release paper liner 98 is removed or unpeeled from the adhesively coated surface by means of an idler roller 114 for directing the release paper 98 to a suitable take-up reel 116 for subsequent reuse. On the laminating drum 112, the adhesively coated surface faces outwardly and is heated by a suitable heating means 118 such as resistance heating units similar to that used for heating the precoated hot melt adhesive in the apparatus of FIG. 1.

A second paper layer 92 which will be used to define the intermediate channels 84, is fed from its supply drum 108 between a resiliant pressure cylinder 120 and an idler roller 122 to be directed past a cutting station 124 which serves to make a plurality of cuts completely through the paper web 92. As with the first paper web 86, the second paper web 92 is precoated with a hot melt adhesive and has a release paper liner 102 which is removed therefrom by passing about an idler roller 126 and directed to a release paper take-up roll 128. As can best be seen from FIGS. 5 and 8, the cutting station 124 includes a cutting drum 130 having a plurality of spaced peripheral cutting knives or blades 132 about the circumference thereof which serves to cut completely through the paper web 92. During this cutting operation, the paper web 92 is held between the pressure cylinder 120 and idler roller 122, and about a following idler 134 which serves to hold the cut strips 92a at a distance from one another equal to the diameter of the wires 90 which will be set therebetween. A steel comb or other device 136 having a plurality of fine teeth is positioned behind the cutting roller 130 to deflect or remove the threads of paper cut from the web 92 so as to provide a series of open spaces or notches 84 in the web 92. The scraps of paper which are removed fall onto a suitable carrier mechanism 138 positioned below the passing web 92, as seen in FIG. 5. As can be seen from FIG. 8, the width of the teeth of the comb 136 correspond substantially to the width of the open channels 84 cut in the web 92 and the spacing between the teeth corresponds to the spacing of adjacent pairs of cutting blades 132. This spacing in turn corresponds to the desired spacing of the wires 90 to be inserted in the channels 84, to be described hereinbelow.

After being cut, the strips of paper 92a are fed about idler roller 140 which serves to maintain the proper spacing for the strips 92a, and then are subsequently fed onto the softened, heated hot melt adhesive on the surface of the first paper web 86. Immediately downstream thereof, wires 90 are fed in the open spaces 84 between adjacent strips 92a and onto the adhesively coated surface of the first paper layer 86. As with the apparatus 10 of FIG. 1, these wires 90 are fed from a suitable supply spooling arrangement 144 through a suitable guide mechanism 146 and guide-heating mechanism 148 for heating the wires just prior to the setting thereof into the channels 84 and onto the adhesively coated surface of the first paper layer 86.

Preferably, only one surface of the second paper layer 92 is coated with a hot melt adhesive, this surface being the surface facing away from the first laminating drum 112 so that only the hot melt adhesive on the first paper web 86 serves to adhesively bond the paper strips 92a to the first paper web 86. However, it is also possible that both surfaces of the paper strips 92a could be precoated with the hot melt adhesive, in which case, when these strips 92a are applied onto the surface of the first paper web 86, the heated hot melt adhesive on the first paper web 86 would serve to heat the hot melt adhesive on the paper strips 92a and thus bond the paper strips 92a and the first paper web 86 together.

Finally, a third paper layer 88, also precoated with a hot melt adhesive, is fed from a third supply drum 106 with the release paper line 100 being removed therefrom about an idler roller 150 and rolled onto a suitable take-up reel 152. The third paper layer 88 is fed about an idler roller 154 onto a second laminating drum 156 which has a suitable heating means 158 arranged thereabout to heat the hot melt adhesive to a suitable application temperature. As the third paper layer 88 is fed about the second laminating drum 156, the laminated first paper layer-wires-paper strips (86, 90, 92a) are applied thereto and pressed into contact in the nip between the first and second laminating drums 112, 156. This laminated paper structure 82 is then fed about the second laminating drum 156 onto a first cooling cylinder 160. A pressure roller 162, preferably covered with a rubber-like plastic coating, is provided which urges the laminated paper structure 82 against the cooling cylinder 160 to render the cooling more effective. The laminate 82 then is directed about a second cooling drum 164. The cooling drum 160, 164 are preferably water-cooled, most preferably under 40° F. These cooling drums 160, 164 serve to cool the hot melt adhesives when the laminate 82 contacts the cooling drums 160, 164 to modify the viscosity of the hot melt so that the hot melt adhesives will become substantially solid, yet flexible, thereby tightly holding the paper layers 86, 92, 88 together as well as holding the wires 90 in their channels 84 between the first and third paper webs 86, 88.

The resulting laminate 82, best seen in FIG. 9, subsequently passes onto a suitable take-up drum 166 for subsequent use, as more fully described hereinbelow. In this regard, it is noted that by virtue of the fact that the hot melt adhesives are only precoated on limited portions of each of the paper layers 86, 88, 92, before lamination, hot melt adhesive is not applied on the entire surfaces between the laminated layers 86, 92 and 92, 88, but rather, an uncoated section or portion 96 exist which is useful for permitting evaporation of water through the laminated paper structure 82 across the mating surfaces of the various paper layers 86, 88, 92.

As with the apparatus 10 described above with reference to FIG. 1, the heating units 118, 158 about the first and second laminating drums 112, 156 may have the distance from the laminating drums 112, 156 varied, depending on the speed of operation of the laminating drums 112, 156 so as to maintain the hot melt adhesive coatings at a suitable temperature to ensure the right degree of viscosity to effectively seal the wires 90 and the intermediate paper strips 92a to and between the first and third paper webs 86, 88. This, as can be appreciated by those skilled in the art, is dependent on the particular hot melt adhesive being utilized. Furthermore, each of the idler rollers 110, 120, 122, 134, 140, and 154, which may come in contact with the adhesively precoated surfaces of the various paper layers or webs 86, 88, 92 are coated with a suitable release coating such as silicon or teflon, to avoid any sticking of the hot melt coat to the coated surfaces of the webs 86, 88, 92 as the webs pass thereabout.

Figure 10:
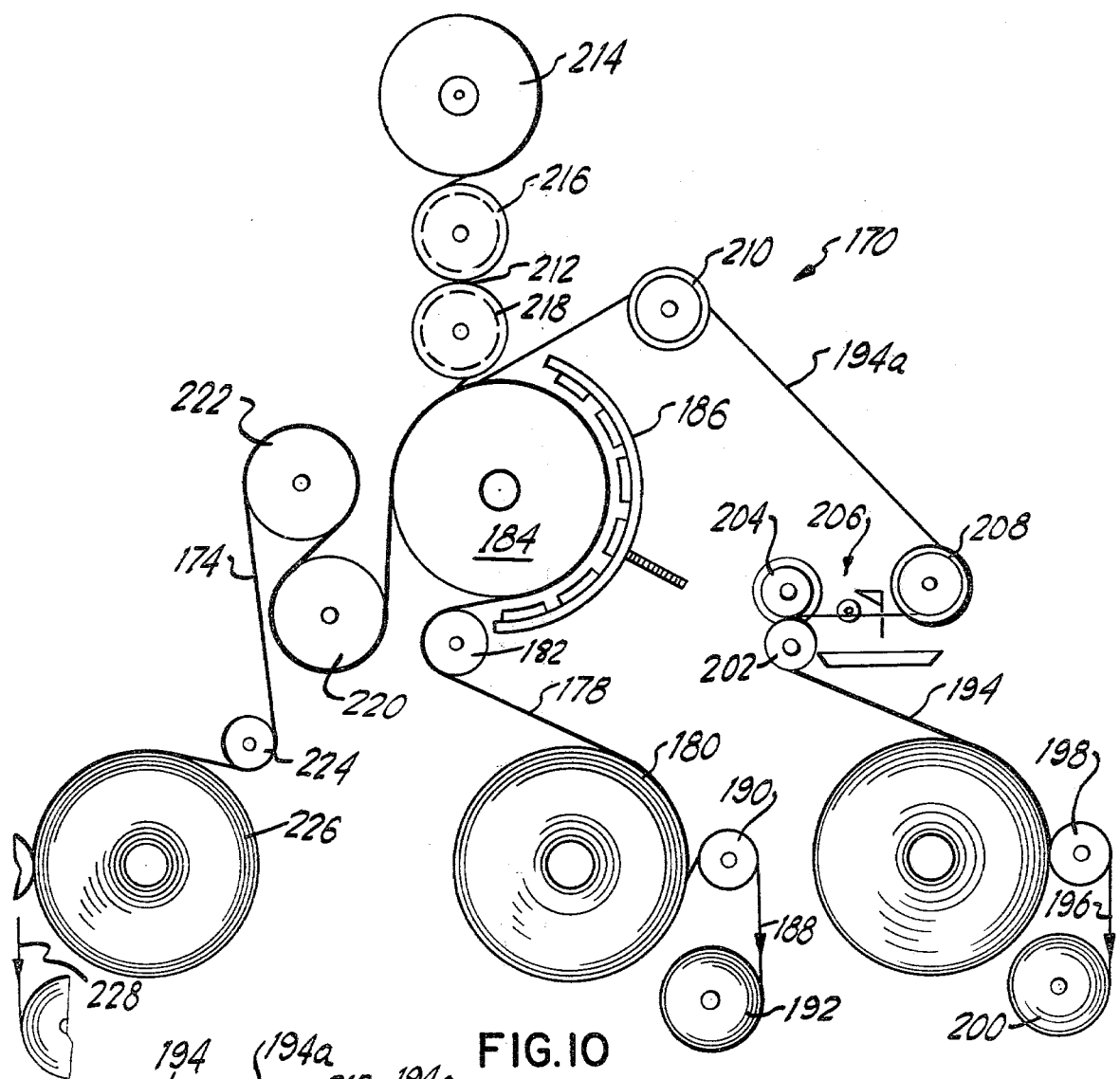
FIG. 10 is a diagrammatic view of another embodiment of an apparatus for manufacturing wire reinforced paper structures in accordance with the present invention and which is particularly useful in the manufacture of a two-way reinforced paper laminate.

A still further alternative apparatus 170 for manufacturing a still further alternative wire reinforced paper laminate 172 in accordance with the present invention, is shown in FIG. 10. In this instance, the apparatus 170 is used for providing a laminate having exceptional two-way strength, as well as superior structural strength, when assembled with a corrugated medium which is also reinforced with wires. In this embodiment, the resulting laminate 172 is comprised of two sub-laminates 174, 176, both of which are manufactured on the apparatus 170 of FIG. 10, and one of which is subsequently reoriented and modified further before final joining of the two sub-laminates 174, 176. This will be more fully described hereinbelow.

With the apparatus 170 of FIG. 10, as with that of FIGS. 1 and 5, a first paper layer 178 is fed from a suitable supply drum 180 about an idler roller 182 onto a single laminating drum 184 where the adhesive coated surface is heated with a suitable heating device 186, such as heating units similar to units 112, 156, to raise the hot melt temperature to a suitable application temperature. The release paper liner 188 is removed about an idler 190 and fed onto a release paper take-up roll 192 for subsequent reuse. As with the FIG. 5 embodiment, a second paper layer 194 with its release paper liner 196 removed about idler 198 and wound onto take-up roller 200, is fed between an idler roller 202 and a pressure contact roller 204 and from there passes through a cutting station 206 which cuts a series of openings or notches in the paper web 194 to form a series of paper strips 194a. This cutting operation is identical to that performed with respect to the FIG. 5 apparatus 80, and therefore need not be described again.

The formed paper strips 194a are fed about rollers 208, 210 onto the heated, softened hot melt adhesive on the first paper layer 178 just prior to the introduction of wires 212 into the spaces formed between the paper strips 194a. The wires 212, as before, are fed from a suitable spool arrangement 214 about a guide roller 216 and guide-heating roll 218 which serves to heat the wires 212 and space the wires 212 at appropriate distances so as to be properly fed into the channels defined between the paper strips 194a and onto the adhesively coated surface of the first paper layer 178.

However, unlike the apparatus 80 in FIG. 5, in the FIG. 10 apparatus 170, the first paper layer 178 and the series of paper strips 194a and wires 212 are then fed about suitable cooling rollers 220, 222 to lower the temperature of the hot melt adhesive to adhesively bond the paper strips 194a and wires 212 to the first paper layer 178. From there, the sub-laminate 174 is fed about an idler roller 224 and onto a take-up roll 226. A release paper 228 is also fed onto the upper precoated adhesive surface of the paper strips 194a and over the wires 212 to prevent sticking of the paper strips 194a to the back of the first paper web 178 after being rolled onto the take-up roll 226.

Again, the hot melt adhesive on the first paper layer 178 is preferably applied in a limited pattern so as to provide both adhesive coated sections (not shown, but similar to 94) and uncoated sections (not shown, but similar to 96) on the finished sub-laminate 174, the adhesive coated sections being of a sufficient area to adhesively secure the paper strips 194a and wires 212 to the first paper layer 178 and the uncoated sections being of a sufficient area to permit evaporation of water through the first paper layer 178 and the paper strips 194a. Further in this regard, the second paper web 194 which is cut into a series of paper strips 194a is also precoated in a limited pattern with a hot melt adhesive on the surface which is not joined to the first paper web 178, i.e., on the surface on which the release paper liner 228 is applied, to provide both adhesive coated portions 195a and uncoated portions 195b.

To form a wire reinforced paper laminate 172 having two-way strength, two such sub-laminates 174, 176' are produced. One of these 174 is simply wound with the release paper liner 228 onto the take-up spool or roll 226. The second sub-laminate web 176', is similar to the first web 174, and therefore the paper layers, wires, etc. which comprise such sub-laminate 176' will be designated with the same reference characters but with a prime (') notation. The second sub-laminate 176', after lamination, is subsequently cut, in any suitable manner, into lengths which are equal to the width of the first sub-laminate 174. These cuts may be accomplished, for example, by directly guiding the formed sub-laminate 176' after cooling to a suitable cutting station 230, or after winding of the sub-laminate on to a suitable take-up roll 232, with a release paper liner 234, transporting the take-up roll 232 to a cutting station 230 and then removing the release paper liner 234 and cutting the second sub-laminate 176'. The cut sections 176a are then arranged in side by side relationship and attached to one another in any suitable manner. In this way, a web laminate 176 is produced which is similar to the first web laminate 174, with the important difference that the wires 212' of the second laminate 176 are transverse to the longitudinal length of the laminate 176, instead of parallel as with the first sub-laminate web 174.

In this regard, it is to be noted that both sub-laminate webs 174, 176' are preferably provided with margins, such as on the order of approximately ½", which are free of wires but which are sealed together. The cut sections 176a of the second sub-laminate 176' are thus cut at lengths equal to the width of the first sub-laminate 174 plus the width of the margins. These margins provide a convenient means for joining of the cut sections 176a together.

Figure 12:
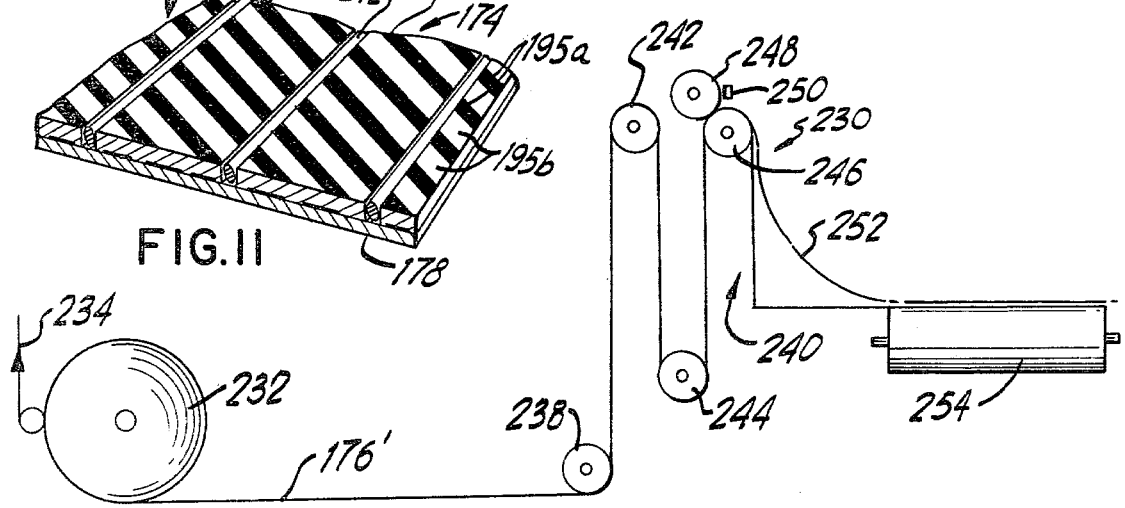
FIG. 12 is a diagrammatic view of an apparatus for severing the wire reinforced laminate and placing the sections in side by side relationship for subsequent joining together to produce a longitudinally extending wire reinforced web with the reinforcing elements disposed transversely of the longitudinal direction of the formed web.

A sample apparatus for accomplishing such cutting and orienting of the web 176' is shown in FIG. 12. The second sub-laminate 176' is fed about a roller 238 to a web length and tension compensator generally denoted by the numeral 240. The compensator 240 includes a roller 242 about which the web 176' passes, a dancer roll 244 which is arranged to move vertically, and a cutter roller 246. A pressure roller 248 bears against the cutter roller 246 to maintain the web 176' in contact at all times with the cutter roller 246. A cutter blade 256 is periodically reciprocated to sever the web 176' in precise lengths. In accordance with the instant embodiment of the present invention, these lengths correspond to the width of the first web 174 plus the margins. Each of the severed lengths 176a of the second web are carried downwardly by a chute 252 onto a belt carrier 254. The speed of the belt carrier 254 and the speed at which the web 176' is transported are coordinated so that each severed web sections 176a is positioned on the belt carrier 254 in substantially contiguous relationship with the previous web section. To achieve this end, additional feed rollers (not shown) may be employed as desired in order to ensure proper movement of the severed web sections 176a on the belt carrier 254. If desired, the severed web sections 176a may also be stacked for processing at a later time.

Figure 11:
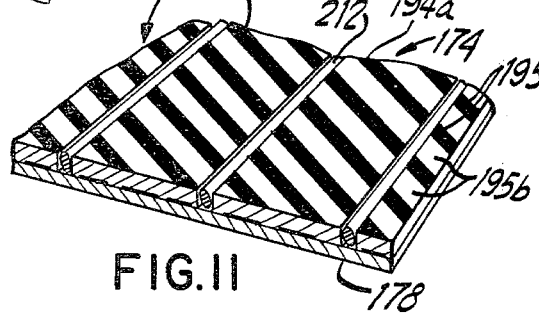
FIG. 11 is a side perspective view of a wire reinforced paper laminate produced with the apparatus of FIG. 10.
Figure 13:
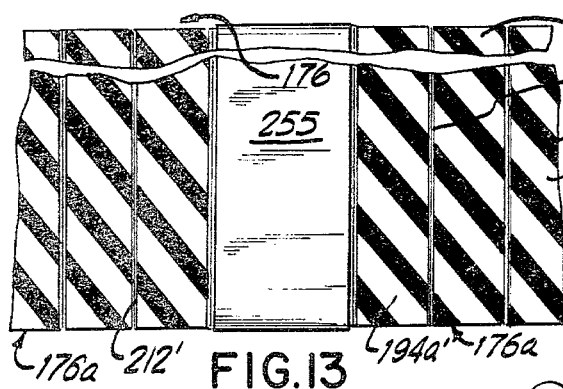
FIG. 13 is a plan view illustrating one method of joining the severed sections in end to end relationship.
Figure 14:
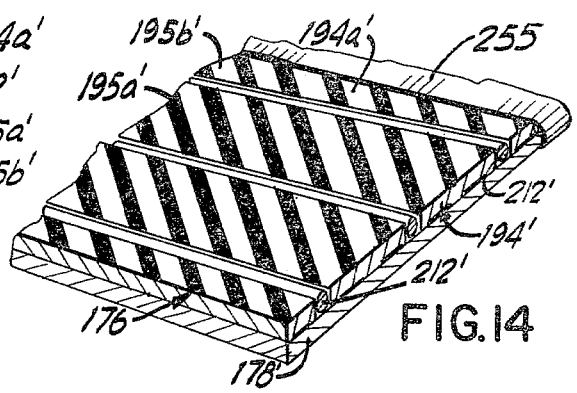
FIG. 14 is a side perspective view of the paper web of FIG. 13 produced by joining of the severed sections in end to end relationship.

After the web sections 176a have been brought into side by side relationship, they are joined together in any suitable manner. For example, as shown in FIG. 13, the sections 176a are secured together with a tape 255 coated with an adhesive which is unaffected by any of the temperatures at which the hot melt adhesive will be subjected in subsequent operations. In this way, the integrity of the joints of the severed sections 176a will be maintained during the subsequent operations. In FIG. 13, it can be seen that the wires 212' positioned between the strips of paper extend transversely of the longitudinal length of the joined sections 176a. This can also be seen in FIG. 14 which is a view similar to the perspective view in FIG. 11 of the first web laminate 174. From a comparison of FIGS. 11 and 14, it can be seen that the wires 212, 212' of the two web sections 174, 176 are oriented in different directions. That is, the wires 212 in the first sub-laminate 174 as shown in FIG. 11, extend in the longitudinal direction of the web 174, whereas the wires 212' of the second, sectional sub-laminate 176, as shown in FIG. 14, extend transversely of the longitudinal direction of the joined sections 176a.

After the severed web sections 176a are joined together, they are wound onto a suitable supply reel 256 (see FIG. 15) with a silicone release line 258 wound therewith overlying the exposed adhesively coated surface of the paper strips 194a' thereof.

Subsequently, the two web laminates 174, 176 are brought to another laminating apparatus for lamination together to form a two-way strength laminate 172, in which the wire reinforcing elements 212 of each of the sub-laminates 174, 176 are disposed transversely to one another, and in particular, perpendicular to one another. That is, the two sub-laminate sections 174, 176 are laminated together so that one set of wire reinforcing elements 212 are disposed transversely to the other set of wire reinforcing elements 212'. In a sense, this forms a type of offset wire mesh or grill, in the form of a grid for the resulting laminate. As can be appreciated, the second set of reinforcing wires 212', transverse to the first set, serves to increase the structural strength of the resulting grind-type laminate 172, and in particular, to provide exceptional two-way strength.

Figure 15:
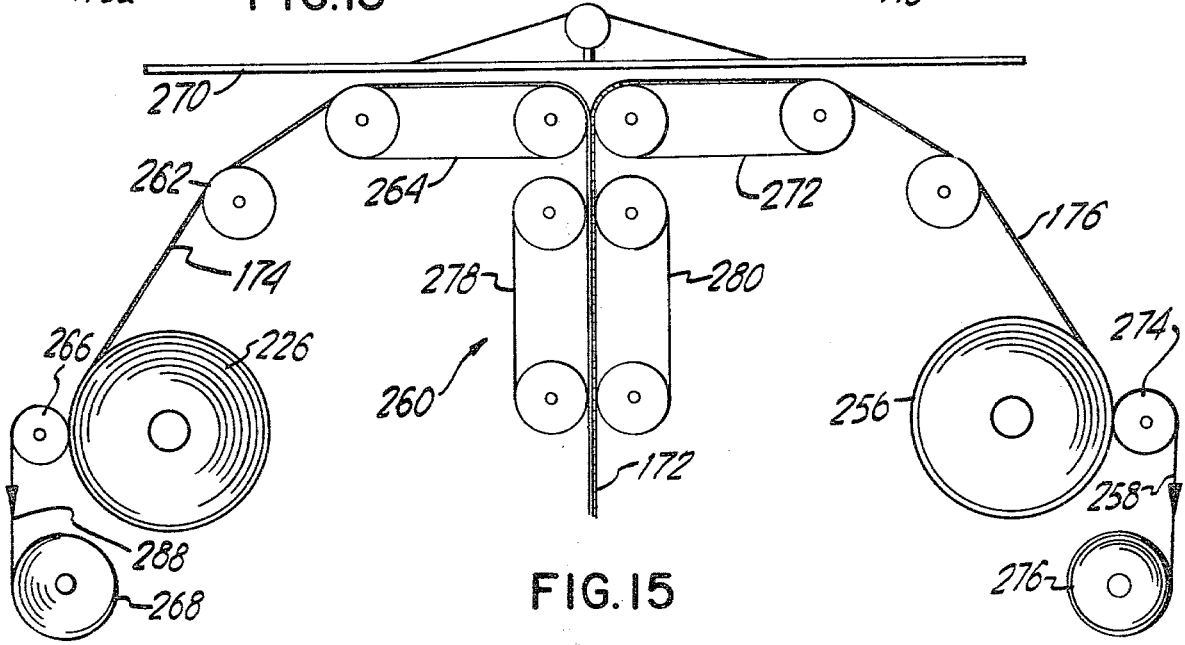
FIG. 15 is a diagrammatic view of an apparatus for joining of two wire reinforced paper laminate webs having their wires running transversely to one another to produce a two-way reinforced paper product.

A suitable apparatus 260 for laminating the two web laminate sections 174, 176 together is diagrammatically illustrated in FIG. 15. The first sub-laminate 174, having its wire reinforcing elements 212 extending longitudinally of the web 174 is provided at the left hand side of the apparatus 260 as shown in FIG. 15, whereas the second sub-laminate 176 having the wires 212' extending transversely of a longitudinal length is provided at the right hand side. The first sub-laminate 174 is passed about an idler roller 262 which feeds the first web 174 onto an endless belted carrier 264. The release paper 228 covering the adhesive coated surface of the paper strips 194a is removed by means of a suitable idler roller 266 and rolled onto a release paper take-up roll 268 for subsequent reuse. The exposed adhesively covered paper strips 194a are oriented to face away from the endless belt carrier 264 and to pass beneath a suitable heating means or unit 270, similar to those described above with reference to FIGS. 1, 5 and 10, arranged in close proximity thereto to heat the hot melt adhesive on the paper strips 194a to its appropriate application temperature.

The second web laminate 176, as with the first, is guided onto a second endless belt carrier 272 to pass beneath the heating unit or device 270 to heat the hot melt adhesive on the exposed surface of the paper strips 194a' thereof. The release paper 258 is removed about an idler 274 and directed on to a take-up roll 276. After the hot melt adhesive on the paper strips of the first and second sub-laminate sections 174, 176 are heated to a suitable application temperature, the first and second endless carriers 264, 272 direct the two webs 174, 176 between the nip between the ends of the carriers 264, 272 to bring the two sub-laminates into contact to join and seal the two sub-laminates 174, 176 to one another along the adhesively coated surfaces of the paper strips of both of the sub-laminates 174, 176.

After passing through the nip between the endless belted carriers 264, 272, the two laminate sections 174, 176 joined together are guided between a pair of endless belt cooling carriers 278, 280 which are coordinated to move the resulting laminate 172 away from the laminating carriers 264, 272 while cooling the structure 172 to a temperature below the setting temperature of the hot melt adhesive to firmly secure and bond the two laminate sections 174, 176 together. Again, the cooling belt carriers 278, 280 may be cooled in any suitable manner, such as with water passing therethrough at a temperature preferably below 40° F. The two cooling belt carriers 278, 280 also serve to maintain the two sub-laminate sections 174, 176 in contact during this cooling process. The resulting laminate 172 having the crisscross wires 212 therein may then be rewound into a suitable take-up reel (not shown), or delivered directly to a corrugating apparatus if the lamination thereof to a corrugated medium is to be made in the same plant as the lamination.

Figure 16:
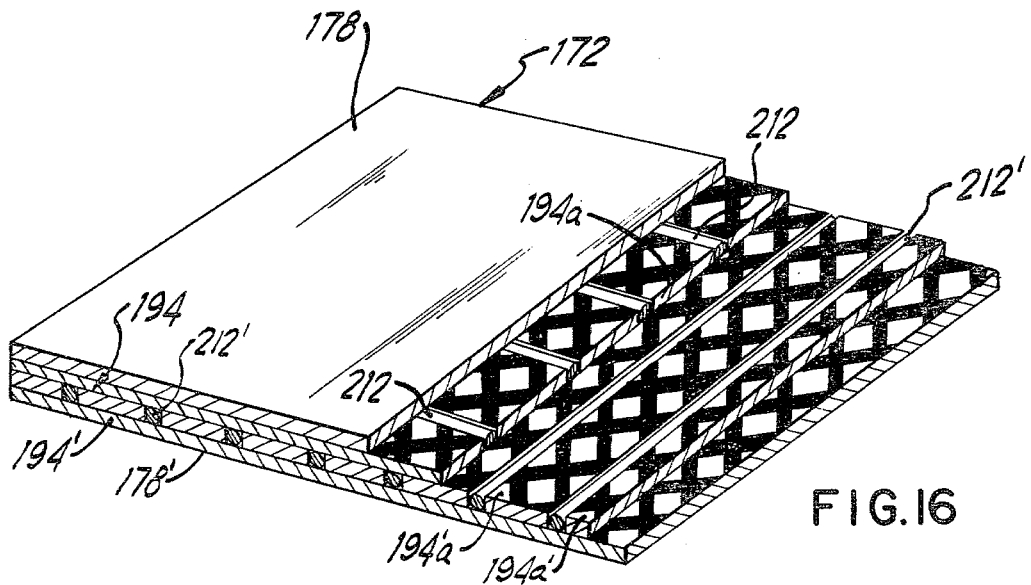
FIG. 16 is a side perspective view of a wire reinforced paper product produced with the apparatus as shown in FIG. 15.

The resulting laminate 172, best seen in perspective in FIG. 16, comprises a pair of outer paper layers 178, 178' and a pair of inner paper structures 194, 194'. The inner paper structures 194, 194' are each comprised of parallel spaced paper strips 194a, 194a' which are oriented transversely to one another. Between each of the respective paper strips 194a, 194a', a wire reinforcing element 212, 212' is provided, and firmly and tightly held in place therebetween by the sides of the paper strips 194a, 194a', an outer paper layer 178, 178', and transversely oriented paper strips 194a, 194a' of the other sub-laminate 174, 176. In addition, the wires 212, 212' themselves are adhesively secured to the outer paper layer 178, 178' and the transversely oriented paper strips 194a', 194a by the hot melt adhesives thereon. In this regard, it is important that the thickness of the paper strips 194a, 194a' correspond substantially to the thickness of the wire elements 212, 212' placed in the channels defined therebetween.

It is to be noted that the resulting laminate 172 with crisscross wires 212, 212' has exceptional two-way strength, as well as great structural strength when adhesively secured to a corrugated medium which is also reinforced with wires. Further, only a minimum number of paper layers are required in producing such a laminate 172, while at the same time ensuring that the wires 212, 212' are firmly held and retained in place. This in part results from the fact that the paper strips 194a' defining the channels for the transverse wires 212' serve to entrap the other wires 212 extending in the longitudinal direction, and vice versa. Thus, separate paper layers or liners are not required. Further, because the wires 212, 212' are adhered to the outer paper layers 178, 178' with the hot melt adhesive, the wires 212, 212' will not fall out of the channels during the manufacturing processes of the various sub-laminates 174, 176, and therefore do not require or need an additional facing during such operation.

Figure 17:
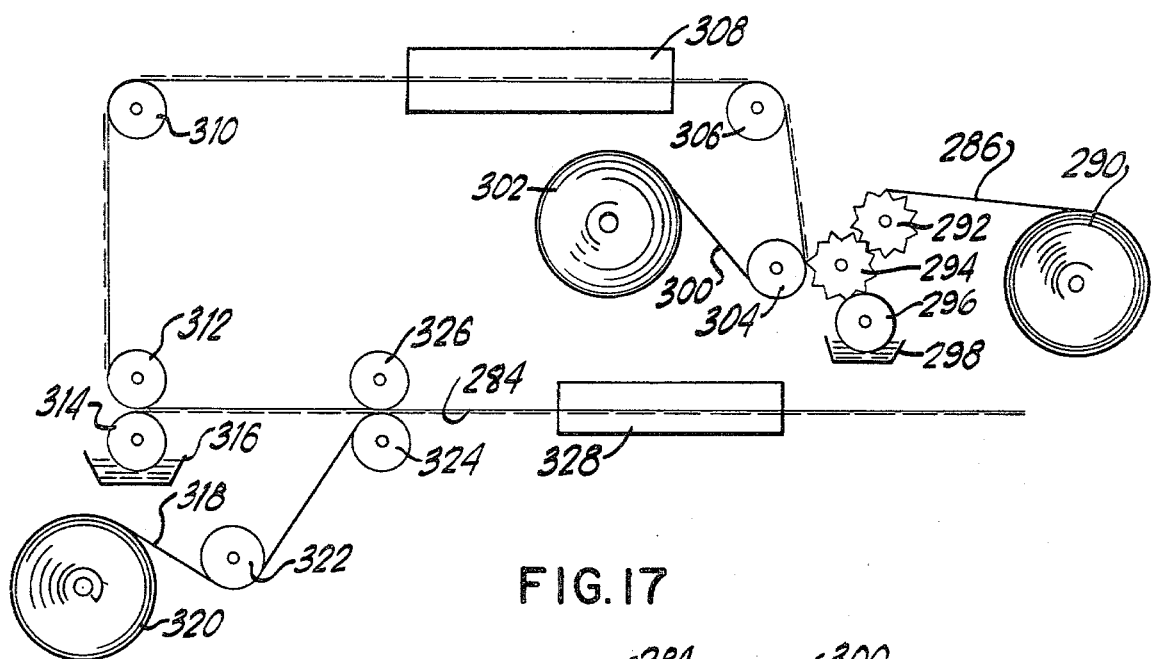
FIG. 17 is a diagrammatic view of the apparatus for producing a wire reinforced corrugated material from wire reinforced paper products in accordance with the present invention.

As noted previously, the various wire reinforced paper structures 12, 82, 172 described hereinabove are particularly useful in producing corrugated board of the type in which a facing or liner is adhered to the crest portions on at least one side of a corrugated medium. FIG. 17 illustrates an embodiment of an apparatus for forming corrugated board which is generally known as double-faced corrugated board. In this regard, a wire reinforced laminate 12, such as for example that produced with the apparatus of FIG. 1 or 5, is used to form the middle layer or corrugated medium of the corrugated board, and wire reinforced laminates 82, 172 such as for example the laminates in FIG. 9 or 16, form the liners or facings of the corrugated board. However, it should be understood that various other types of structures could also be manufactured with such apparatus, such as for example a corrugated medium which is wire reinforced, and one or more outer facings or liners which do not have any wires at all.

More specifically, with reference to FIG. 17, a wire reinforced laminate 286, such as the laminate 12 produced by the apparatus 10 shown in FIG. 1, is fed from a roll 290 about a pair of corrugating rollers 292, 294. The corrugating rollers 292, 294 are standard corrugating rollers which serve to corrugate the wire reinforced laminate 286 transversing of the wires adhesively secured between the two paper layers thereof. An adhesive, such as a water-based emulsion adhesive, is applied to the corrugated laminate by a roller 296 immersed in an adhesive containing trough 298. A second paper laminate 300, which in the embodiment shown comprises a paper laminate having crisscrossed wires, similar to that shown in FIG. 16, is fed from a roll 302 about an idler roller 304 which bears against the corrugating roller 294, and in so doing, produces a structure in which a single liner 300 is adhered to the crests on one side of the corrugated medium 286. The corrugated structure or medium 286 with the paper layer 300 secured to the crest portions of one side thereof then passes about another idler roller 306 whereupon it is fed to and through a suitable oven 308 to evaporate the liquid and cure the adhesive.

In this regard, it will be appreciated that such evaporation is greatly facilitated by virtue of the fact that the hot melt adhesive bonding the various paper layers together of the crisscrossed wire laminate outer facing 300 is only coated on a portion of each of the various mating surfaces to provide substantial uncoated portions at each mating surface. Thus, the water or other liquid may evaporate completely through the various layers and strips of the outer facing 300 and thereby cure the water-based emulsion adhesive to secure the facing 300 to the corrugated medium 286.

While different types of adhesives could be used which do not require evaporation of water, conventional corrugating apparatus presently in existence have been designed for use with water-based emulsion adhesives or similar adhesives which require evaporation of a liquid. Therefore, the various paper laminates, in accordance with the present invention, may be easily adapted for use in such conventional corrugated apparatus. Further, although the corrugated medium 286 has not been shown as being provided with hot melt adhesive applied on less than the total mating surfaces, if desired, such wire reinforced paper products for forming the corrugated medium could also be provided with partially coated hot melt adhesive. However, this is not necessary as long as the outer liner is so provided with partially coated hot melt adhesive portions at each of the adhesively joined paper layers.

The corrugated structure with the single liner 300 applied to one side thereof, upon passing out of the oven 308 is then fed about a roller 310 to a second adhesive applying station consisting of a roller 312 and an adhesive applying roller 314, the latter being immersed in an adhesive containing trough 316. Again, the adhesive is a water-based emulsion adhesive. At this adhesive applying station, the adhesive is applied to the crest portions of the other side of the corrugated laminate structure 286 and a third wire reinforced paper structure 318, which in the embodiment shown in identical to the first laminate structure 300 having crisscross wires therein, (as shown in FIG. 16) is fed from a roll 320 about rollers 322, 324, the latter being in contact with the corrugated layer or medium 286 as it is emerges from the adhesively applying station. A suitable back-up roller 326 cooperates with the roller 324 to ensure firm contact between the layer or web 318 and the corrugated layer 286. The resulting structure 284, shown in perspective, partly in cross-section and partly broken away, in FIG. 18, which has been greatly enlarged for purposes of clarification, comprising the corrugated medium 286 with outer facings or liners 300, 318 on each side thereof, then passes through a second oven 328 to evaporate the liquid or water, and cure the adhesive applied at the second adhesive applying station. Again, this evaporation is greatly facilitated since the second liner 318, as with the first 300, has partially coated portions and uncoated portions of hot melt adhesive at each of the boundaries or mating surfaces of the various paper layers and paper strips thereof.

Figure 18:
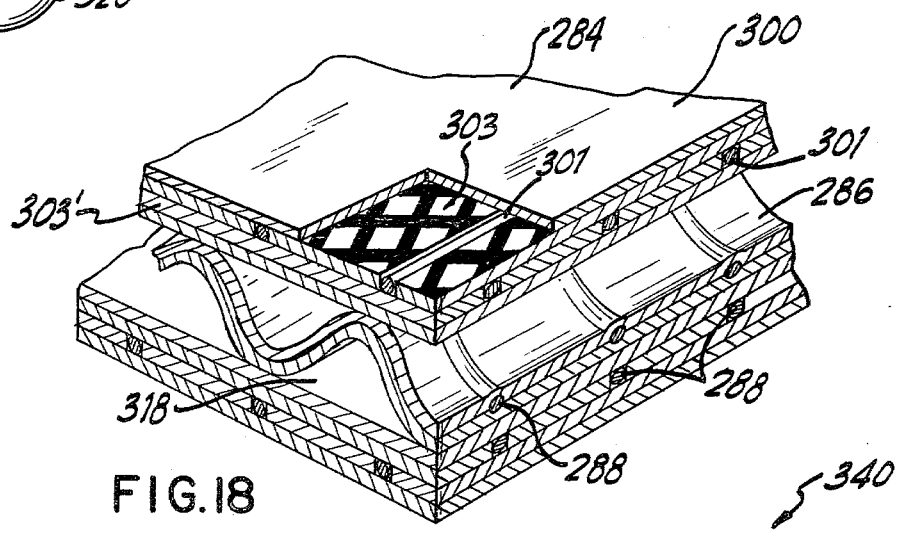
FIG. 18 is an enlarged side perspective view, partly in section and partly broken away, showing a double faced wire reinforced corrugated board in accordance with the present invention in which a laminated paper structure produced with the apparatus of FIG. 16 forms the liners and in which a laminated paper structure produced with the apparatus of FIG. 1 forms the corrugated medium.

As can be seen in FIG. 18, the corrugated medium 286 of corrugated board 284 comprises a wire reinforced laminate structure in which the corrugations extend transversely of the wires 288 therein. Each of the outer facings or linings 300, 318 are provided with crisscrossed wires 301 which are provided in channels defined between paper strips 303, 303a which are adjacent to one another and adhesively bonded to one another.

Figures 19, 20:
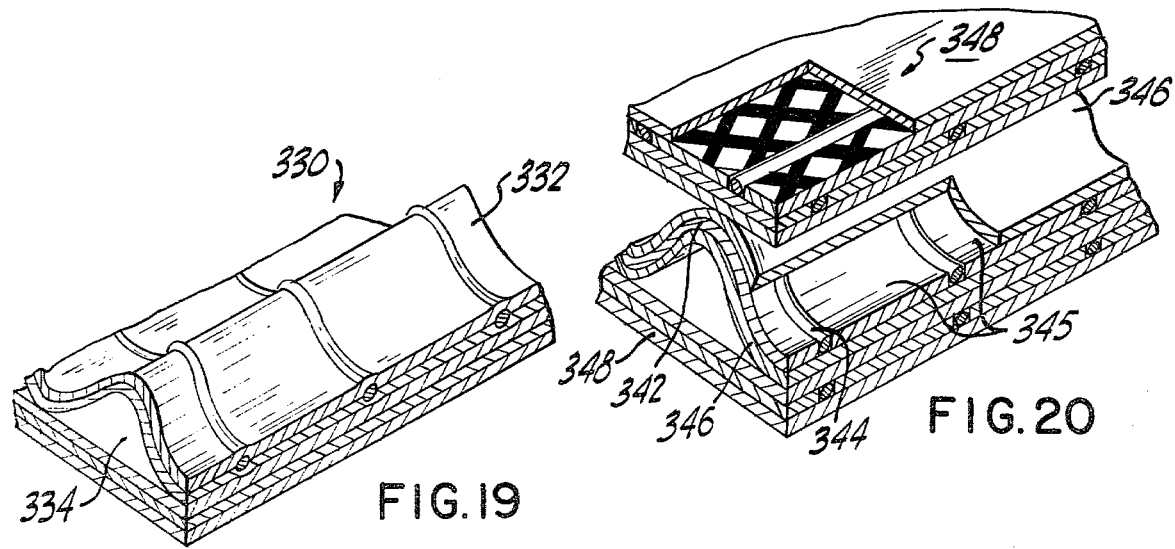
FIG. 19 is an enlarged side perspective view, partly in section, showing a single faced wire reinforced corrugated board in accordance with the present invention in which a laminated paper structure produced with the apparatus of FIG. 1 forms the corrugated medium and a laminated paper structure produced with the apparatus of FIG. 5 forms the liner.
FIG. 20 is a enlarged perspective view, partly in section and partly broken away, similar to that shown in FIG. 18 but in which a wire reinforced paper product produced with the apparatus of FIG. 5 is used as the corrugated medium.

Other examples of different types of corrugated products 330, 340 comprised of wire reinforced paper laminates are shown in FIGS. 19 and 20. In FIG. 19, the corrugated medium 332, which again comprises a wire reinforced laminate 12 such as shown in FIG. 4, has its crests on one side adhesively secured to a liner 334 comprised of a laminate 82 shown for example in FIG. 9 to form a single faced corrugated product 330. A double faced corrugated board 340 is shown in FIG. 20, substantially similar to that shown in FIG. 18 with the exception that the corrugated medium 342 is formed from a wire reinforced laminate 82 shown in FIG. 9 in which the wires 344 are placed between paper strips 345 between a pair of outer layers 346. A pair of outer facings 348, such as the crisscrossed wire reinforced laminate 172 of FIG. 16, are secured to the crests of the corrugated medium 342. Thus, in FIG. 20, the corrugated medium 342 has a smooth outer contour surface whereas the corrugated mediums 286, 332 in both FIGS. 18 and 19 have small ribbed portions resulting from the wires being simply bonded between a pair of paper layers.

Preferably, in the embodiments of the present invention described hereinabove, for wire sizes greater than 12 mils in thickness, the wires are placed in channels (see FIG. 9) defined for example by paper strips having the same thickness as the wires, whereas for smaller wire sizes, either the wires may be placed in channels or simply placed between paper layers (see FIG. 4). In this regard, with the small wire sizes in which the laminate is used in the corrugated medium, the ribbed portions will not adversely affect the adherence to the liners and in most instances will not even be noticed since the corrugated medium is covered on both sides with liners.

While in the preferred embodiments described herein the wires are preferably on the order of 5 mils to 25 mils in thickness, and still more preferably between 10 mils and 15 mils, of course it should be realized that even finer wires could be used than those of 5 mils, such as in manufacture of small boxes used in gift shops, for cosmetics or perfumes for instance. Also, when exceptionally strong double faced corrugated walls are required, even thicker wires could be used, such as if the double faced corrugated board were being used for partitions in buildings or as sea containers. However, in most applications in making corrugated board for corrugated cardboard boxes used for shipping, 15 mil wires will be sufficient in the corrugated medium and will provide exceptional strength to permit stacking of many boxes manufactured from such corrugated double faced cardbaord. Also, 15 mil wire is most preferred as it is of a size which is easy to handle by personnel in the corrugating plant. For example, 15 mil wire will not easily cut individuals whereas smaller wires might possibly cut the personnel if it became exposed. On the other hand, 20 mil wire, being thicker than the 15 mil wire, is not as easy to bend. Also, as with the wire reinforcing elemens of the copending Application Ser. Nos. 878,158 and 599,142, the spacing between such wire elements in the paper structures may be almost any desired spacing but is preferably on the order of $\frac{1}{8}''$ to $\frac{1}{2}''$.

Also, the paper used for the various paper webs in the manufacture of wire reinforced laminates are similar in characteristics to those presently being used in manufacturing of facings or liners for use in corrugated paper board with the difference that they are generally of a weight or thickness which is only about half the weight of such conventional paper board. Furthermore, it is to be noted that because of the great strength provided by the reinforcing wires or elements, it is possible that one or even both of the layers used in the manufacture of such facings could be made of recycled paper which would significantly lower the cost of the final product. In this regard, paper of the intermediate paper layers can also be easily made from recycled paper as the strips used for defining the channels for the wires are not used so much as to add strength to the laminate, but mainly to hold the wires laterally and give evenness to the resulting surface.

Also, it should be noted that the wire reinforced laminates disclosed herein need not necessarily be used only with respect to the manufacture of corrugated cardboard, although they provide exceptional strength in such corrugated cardboard. For example, the wire reinforced laminate, in particular the crisscrossed laminate which is shown in FIG. 16, could be used to manufacture two way strength tapes by having one of the outer surfaces of the outer paper layers coated with a suitable mucilage or gum sticking, and therefore used to close container boxes made from the double faced corrugated board made in accordance with the present invention, or for that matter, any containers made in conventional manners, or for reinforced corners or angles of such boxes.

It should be noted that one of the advantages of using hot melt is that great pressure in bringing the various substrates together is not required. This is in particular an advantage over latex adhesives which have generally been pressure sensitive. Also, it is to be noted that in heating of the precoated paper layers for adhesion of other papers or wires, only the surface of the hot melt need be heated to soften such surface for application of the additional substrate and not the entire thickness of the hot melt layer.

Therefore, it is seen that in accordance with the present invention, there is provided a wire reinforced paper laminate, 12 for example, in which a plurality of reinforcing wires 14 are interposed between a pair of outer paper layers 16, 18, and a hot melt adhesive adhesively secures the paper layers 16, 18 together and further secures the wires 14 to at least one of the paper layers 16, 18. Because an adhesive bond is formed between the wires 14 and at least one of the outer paper layers 16, 18, the wires 14 will be firmly held in place and will not shift during subsequent cutting and/or corrugating operations.

In accordance with another aspect of the present invention, hot melt adhesive is applied in patterns on the surfaces of the paper layers, for example 86, 92 and 92, 88, to be joined together so as to provide both adhesively coated portions 94 and uncoated portions 96 of the laminated paper structure 82. The adhesively coated portions 94 are of a sufficient size to adhesively bond the paper layers 86, 92 and 92, 88 together whereas the uncoated portions 96 are of sufficient area or size to permit evaporation of water between the paper layers 86, 92, 88, i.e., across or through the mating surfaces of the paper layers. This is particularly important in the corrugated industry in which the liners and corrugated medium are adhesively secured to one another with conventional corrugating apparatus which use water-based emulsion adhesives, thereby requiring evaporation of water in order to form an adequate bond.

In accordance with a still further aspect of the present invention, the paper layers, 16, 18 for example, are precoated with a hot melt adhesive prior to their actual use in the laminating process, the hot melt adhesive thus being provided at the laminating apparatus at a temperature below its setting temperature so that it is capable of moving about the laminating rollers and drums without sticking thereto. Release paper layers 24, 56 cover the adhesively coated surface of the paper layers 16, 18 which are then removed just prior to the laminating process. Thus, the rolls of paper may be easily precoated and transported both prior to and after the laminating process since the hot melt adhesive only produces a bond with those materials it comes into contact when it is at above its setting temperature, and then allowed to cool below its setting temperature. Thus, when the hot melt adhesive is below its setting temperature, materials which come into contact therewith will not become bonded thereto with the hot melt adhesive.

Further in accordance with the present invention, there is provided an improved two-way strength wire reinforced paper structure 172 which requires less paper while still maintaining and firmly holding the wires 212, 212' extending in transverse directions in place between outer paper layers 178, 178'.

While preferred embodiments of the present invention have been shown and described, it will be understood that such is merely illustrative and that changes may be made without departing from the scope of the invention as claimed.

What is claimed is:

1. A corrugated paper structure comprising:
   a corrugated paper medium having a series of crests;
   a paper liner adhered to the crests of one side of said corrugated paper medium with a water-based emulsion adhesive; and
   at least one of said corrugated paper medium and said paper liner being comprised of a laminated paper structure, said at least one laminated paper structure in turn comprising first and second paper layers arranged in overlying relationship, and a hot melt adhesive interposed between the facing surfaces of said first and second paper layers for adhesively securing said first and second paper layers together, said hot melt adhesive being on less than the entire areas of said facing surfaces of said first and second layers to provide a first adhesive coated section and a second uncoated section, said first adhesive coated section being of a size sufficient to adhesively secure said first and second paper layers together, and said second uncoated section being of a size sufficient to permit evaporation of water between said first and second paper layers across said facing surfaces thereof.

2. The corrugated paper structure of claim 1 wherein each of said corrugated paper medium and said paper liner are comprised of said laminated paper structure.

3. The corrugated paper structure of claim 1 wherein said paper liner comprises a first paper liner adhered to the crests of one side of said corrugated medium, further including a second paper liner adhered to the crests of the other side of said corrugated paper medium with a water-based emulsion adhesive, and wherein at least said first and second paper liners are comprised of said laminated paper structure.

4. The corrugated paper structure of claim 3 wherein said corrugated paper medium and both said first and second liners are comprised of said laminated paper structure.

5. The corrugated paper structure of claim 2 wherein each said laminated paper structure includes a plurality of parallel, longitudinally extending wires interposed between said facing surfaces of said first and second paper layers, and wherein said hot melt adhesive adhesively secures said plurality of wires to at least one of said facing surfaces of said first and second paper layers.

6. The corrugated paper structure of claim 2 wherein each said laminated paper structure includes a plurality of channels defined in said facing surface of said first paper layer, said channels being parallel to one another and being of a depth less than the thickness of said first paper layer, and a plurality of longitudinally extending wires in said channels in said first paper layer whereby said wires are secured in place between said first and second paper layers.

7. The corrugated paper structure of claim 6 wherein said first paper layer of each said laminated paper structure comprises a paper web and a plurality of spaced strips of paper adhesively secured to said paper web, said strips of paper being parallel to one another and spaced so that the spacing between adjacent strips defines said channels, and wherein said second paper layer is adhesively secured to said plurality of spaced strips with said hot melt adhesive.

8. The corrugated paper structure of claim 7 wherein said paper strips of each said laminated paper structure are adhesively secured to said paper web with a hot melt adhesive which is on less than the entire areas of said facing surfaces of said paper web and said paper strips.

9. The corrugated paper structure of claim 1 wherein said adhesive coated section of each said laminated paper structure covers from 40-60 percent of each of the areas of said facing surfaces of said first and second layers.

10. The corrugated paper structure of claim 9 wherein said first adhesive coated section of each said laminated paper structure cover approximately 50 percent of each of the areas of said facing surfaces of said first and second paper layers.

11. A corrugated paper structure comprising:
a corrugated paper medium having a series of crests, said corrugated paper medium comprising a first pair of paper layers arranged in overlying relationship to one another, a first plurality of wires interposed between said paper layers of said first pair, and a first hot melt adhesive interposed between said paper layers of said first pair, said first hot melt adhesive adhesively securing said wires of said first plurality to at least one of the surfaces of said paper layers of said first pair and adhesively securing said first pair of paper layers together, said first pair of paper layers with said wires of said first plurality adhesively secured therebetween being corrugated transversely of said wires of said first plurality; and
at least one paper liner adhered to the crests of one side of said corrugated paper medium with a water based emulsion adhesive, said at least one paper liner being comprised of a second pair of paper layers arranged in overlying relationship to one another, a second plurality of wires interposed between said paper layers of said second pair, and a second hot melt adhesive interposed between said paper layers of said second pair, said second hot melt adhesive adhesively securing said wires of said second plurality to at least one of the surfaces of said paper layers of said second pair and adhesively securing said second pair of paper layers together, said second hot melt adhesive being on less than the entire areas of the facing surfaces of said paper layers of said second pair to provide an adhesive coated section and an uncoated section, said adhesive coated section of said second pair of paper layers being of a size sufficient to adhesively secure said paper layers of said second pair together and said uncoated section of said second pair of paper layers being of a size sufficient to permit evaporation of water through said paper layers of said second pair.

12. The corrugated paper structure of claim 11 wherein said at least one paper liner comprises a first paper liner adhered to the crests of one side of said corrugated paper medium, and further including a second paper liner adhered to the crests of the other side of said corrugated paper medium with a water based emulsion adhesive, said second paper liner comprising a third pair of paper layers arranged in overlying relationship to one another, a third plurality of wires interposed between said paper layers of said third pair, and a third hot melt adhesive interposed between said paper layers of said third pair, said third hot melt adhesive adhesively securing said wires of said third plurality to at least one of the surfaces of said paper layers of said third pair and adhesively securing said third pair of paper layers together, said third hot melt adhesive being on less than the entire areas of the facing surfaces of said paper layers of said third pair to provide an adhesive coated section and an uncoated section, said adhesive coated section of said third pair of paper layers being of a size sufficient to adhesively secure said paper layers of said third pair together and said uncoated section of said third pair of paper layers being of a size to permit evaporation of water through said paper layers of said third pair.

* * * * *